(No Model.)
W. W. JACKSON.
BUSHING VALVE AND FAUCET ATTACHMENT FOR CASKS.
No. 339,297. Patented Apr. 6, 1886.
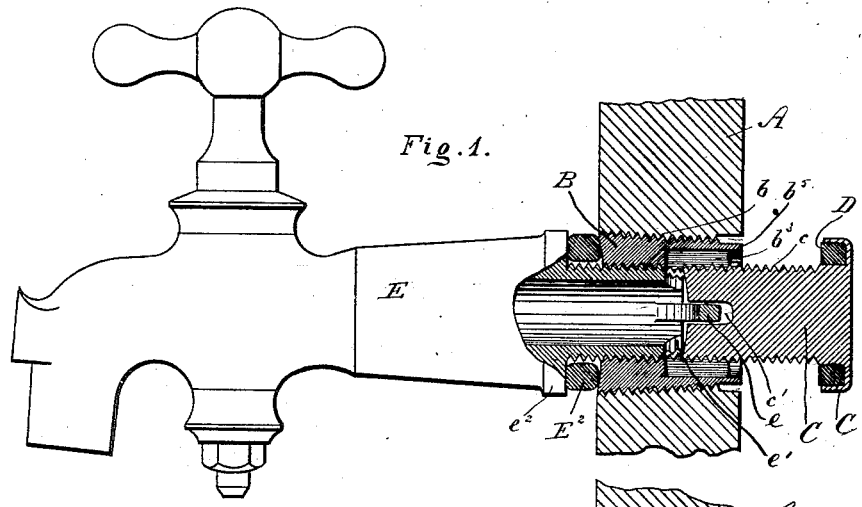
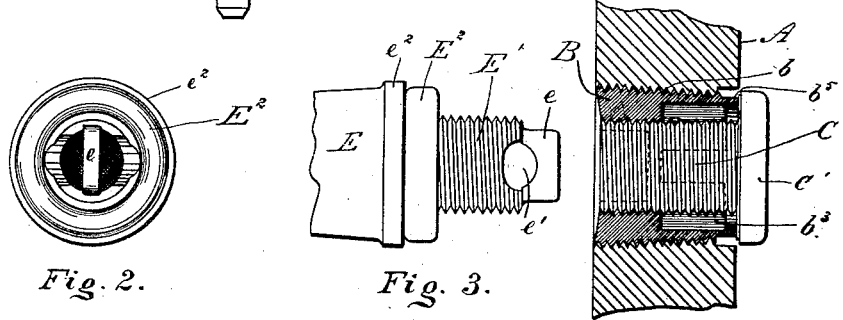
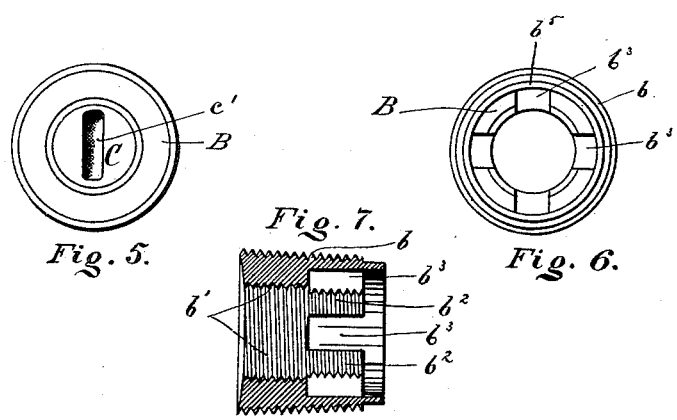
WITNESSES:
C. B. Stange
L. Holmboe
INVENTOR
William W. Jackson
BY Rira & Fisher
His ATTORNEYS.
N. PETERS, Photo-Lithographer, Washington, D. C.

UNITED STATES PATENT OFFICE.

WILLIAM W. JACKSON, OF CHICAGO, ILLINOIS.

BUSHING-VALVE AND FAUCET ATTACHMENT FOR CASKS.

SPECIFICATION forming part of Letters Patent No. 339,297, dated April 6, 1886.

Application filed October 18, 1884. Serial No. 145,834. (No model.) Patented in Canada March 17, 1883, No. 16,512.

*To all whom it may concern:*

Be it known that I, WILLIAM W. JACKSON, a citizen of the United States, residing at Chicago, in the county of Cook and State of Illinois, brewer and malster, have invented certain new and useful Improvements in Bushing-Valve and Faucet Attachments for Casks, of which I do declare the following to be a full, clear, and exact description, reference being had to the accompanying drawings, forming part of this specification.

My present invention has for its object the improvement of that class of faucet and bushing-valve attachments for casks wherein there is employed, in connection with a permanent bushing, a valve located within the cask and adapted to be opened and closed with certainty by the respective actions of inserting and withdrawing the faucet.

To this end my invention consists in certain novel features of construction hereinafter described, illustrated in the accompanying drawings, and particularly defined in the claims at the end of this specification.

Figure 1 is a view in vertical longitudinal section through the bushing, the valve, and the faucet end, the body of the faucet being shown in side elevation. Fig. 2 is a rear end view of the faucet. Fig. 3 is a view in side elevation of the rear portion of the faucet. Fig. 4 is a view in vertical longitudinal section of the bushing, the valve being shown therein in elevation and in closed position. Fig. 5 is a front view of the bushing with the valve therein. Fig. 6 is a rear view of the bushing with the valve removed. Fig. 7 is a a view in longitudinal section of the bushing with valve removed.

A designates the main body or staves of the cask, within a suitable perforation in which is inserted, by means of the usual threaded wrench, the bushing B, exteriorly threaded, as at $b$, to better retain it in place. This bushing is preferably made of a length approximately equal to the thickness of the staves of the cask upon which it is to be used, so that it may not project within the cask sufficient distance to interfere with the cleaning or "pitching" operations, and may have its outer end flush with the periphery of the cask. Upon the inner surface of the bushing are cut the continuous threads $b'$ and the segmental threads $b^2$, with which engage the threads $c$ of the valve C, and between the segmental threads $b^2$ are formed the ports $b^3$, adapted to be opened and closed by the operation of the valve, as will hereinafter more fully appear.

The inner end of the bushing B is preferably provided with a reduced plain rim, $b^5$, against which, when the valve is closed, will be drawn the packing-ring D, of rubber, leather, Babbitt metal, or the like, that is retained within an annular seat formed in the flanged end $C'$ of the valve. By this means a tight packing for the valve is secured, which effectually guards against all danger of accidental leakage. Moreover, the rear end of the bushing, being so reduced as to enter the annular groove of the valve, will maintain a tight joint with the packing-ring until such ring is completely worn away, and the ring will be protected from the action of the hot liquor used in cleaning the barrels and from the pitch used in the pitching operation. The body of the valve, which is by preference formed solid, is of such length that its outer end will, when the faucet is withdrawn, obstruct the bore of the bushing to prevent its fouling, and thus avoid the necessity of the supplemental plug heretofore employed for this purpose. In the end of the valve is formed a suitable seat or recess, $c'$, adapted to receive the projection $e$, formed on the inner end of the faucet E, or the end of a suitable turning wrench or bar, when required. In the side wall of the faucet, near the projection $e$, are formed suitable openings, $e'$, through which liquid may enter to the main channel of the faucet from the ports $b^3$ when the valve is opened. The inner reduced end, $E'$, of the faucet, which is exteriorly screw-threaded, as shown, is of a diameter equal to the bore of the bushing, and its threads are adapted to engage with the threads thereof. The body of the faucet may be furnished with a shoulder, $e^2$, between which and the end of the bushing a suitable packing ring or washer, $E^2$, may, if desired, be placed.

From the foregoing description the operation of parts will be manifest. Assume the bushing to have been placed in the cask with the valve closed, as shown in Fig. 4. In this position no leakage of liquid is possible, as the bore of the bushing is not only tightly closed by the flanged end of the valve and the packing-ring D, but, moreover, the forward threaded portion of the valve fitting within the threads $b$ of the bushing aids to effectually guard against any possible escape of liquid. If, now, the projection $e$ of the faucet be inserted into the seat $c'$ on the front end of the valve and the faucet be turned to the right, the valve will be forced backward and the threads of the faucet will at the same time enter those of the bushing. This movement will be continued until the valve uncovers the parts of the bushing, as seen in Fig. 1, and is held by the threads $b'$, and the ring $E^2$ is forced against the end of the bushing. In this position, when the cock of the faucet is turned, the liquid can discharge freely through the ports of the bushing and the openings $e'$ and bore of the faucet. If, now, the faucet be turned toward the left to withdraw it, the projection $e$ engaging with the end of the valve will cause the valve to advance until the packing-ring on its flanged end is brought to bear against the inner end of the bushing, at which moment the threads of the faucet pass from out those of the bushing. A final partial turn of the faucet will serve to tighten the bearing of the valve-seat.

It will be noticed that as the valve advances into the full threads $b$ of the bushing it closes the ports $b^3$, so that there is no danger of leakage as the faucet is withdrawn.

If it is desired at any time to tighten or open the valve, a pocket-wrench of suitable construction may be inserted for the purpose in its recessed end.

The advantages of my improved construction of faucet and bushing attachment have been already outlined, and will be apparent to those familiar with the art.

While I have defined what I regard as the best embodiment of my invention, I do not wish to be understood as restricting the scope of the invention to the details of construction, as these may be varied within wide limits. Thus, for example, instead of forming the discharge-ports in the bushing, these may be formed in the valve. The location and arrangement of the valve seat may also be varied, and, instead of a recess in the outer end of the valve, it may be adapted in any other suitable manner for engagement with the end of the faucet. So, also, various other modifications will readily suggest themselves to the skilled mechanic, which will clearly fall within the broad scope of the invention, and it will be apparent that certain features of the invention may be employed without the others.

Having thus described my invention, what I claim as new, and desire to secure by Letters Patent, is—

1. The combination of the interiorly-threaded bushing having axial channels on the interior surface of the rear end thereof and the exteriorly-threaded valve adapted to fit within the bushing and having a flanged end to close said channels, substantially as described.

2. The combination, with the bushing having its interior surface screw-threaded from end to end, and having axial channels in the rear portion of said interior surface, of the threaded valve adapted to fit within the bushing and close said channels, substantially as described.

3. The combination, with an interiorly-threaded bushing having axial channels on its inner surface and an exteriorly-threaded valve, of a faucet having a threaded portion to engage with the threads of the bushing and having cut-away spaces in its sides, substantially as described.

4. The combination, with an interiorly-threaded bushing, of a valve having an exteriorly-threaded solid stem of practically the same length and diameter as the bushing, whereby when the valve is closed its stem will be flush with the face of the bushing in such manner as to fill the bushing and protect all threads against fouling, substantially as described.

5. The combination, with the interiorly-threaded bushing, of a valve having a solid screw-threaded stem adapted to fill the bore of the bushing at its face when the valve is closed, and a faucet having a threaded end adapted to enter the bushing a distance less than the entire length of the bushing, said valve and faucet being provided with suitable means—such as a lug and seat—for engagement, substantially as described.

6. The combination, with the interiorly-threaded bushing having the reduced rim at its rear end, of the exteriorly-threaded valve having a flanged end provided with an annular seat to receive a packing-ring, substantially as described.

WILLIAM W. JACKSON.

Witnesses:
 JAMES H. PEIRCE,
 GEO. P. FISHER, Jr.